May 28, 1963 H. N. BARR ET AL 3,091,581
FISSIONABLE FUEL CAPSULES AND METHOD OF MANUFACTURING SAME
Filed March 3, 1958
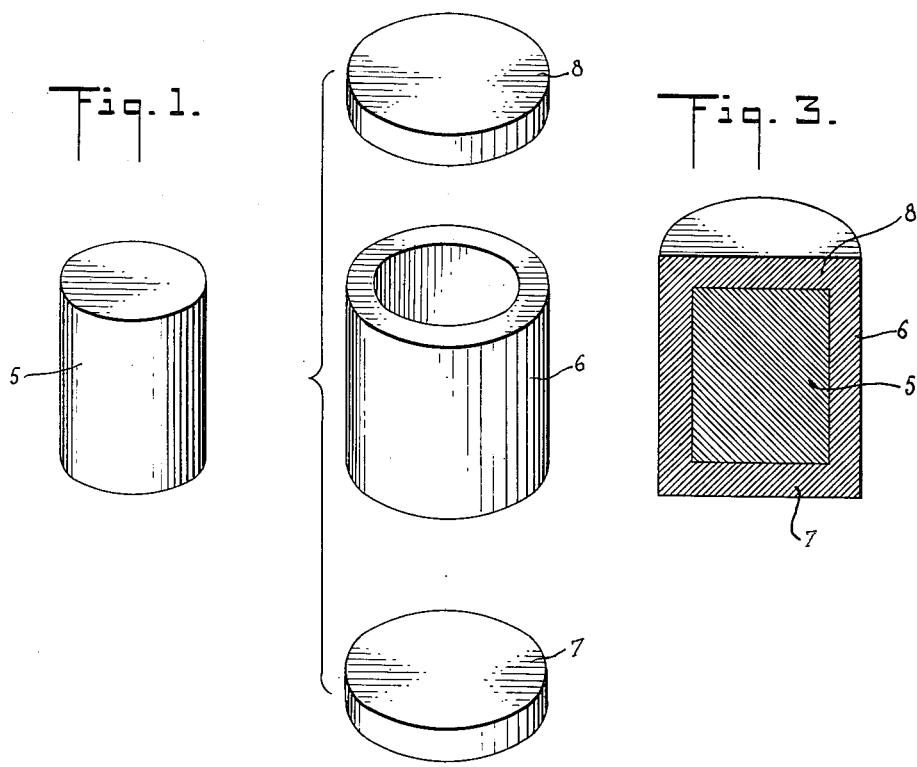
INVENTORS
HAROLD N. BARR
LOUIS FRANK
BY Benjamin G. Webb
ATTORNEY 3,091,581
FISSIONABLE FUEL CAPSULES AND METHOD OF MANUFACTURING SAME
Harold N. Barr and Louis Frank, Forest Park, Baltimore, Md., assignors to Martin-Marietta Corporation, a corporation of Maryland
Filed Mar. 3, 1958, Ser. No. 718,701
1 Claim. (Cl. 204—193.2)

This invention relates to a novel fuel element for use in a nuclear reactor, and also it relates to the method of producing the same.

At present, wrought metal clad is used in the manufacture of nuclear fuel elements for support and protection of the core material and for containment of fission products formed in the fissionable core material. Such core materials may be, for example, a metal such as uranium, a cermet such as $UO_2$ mixed with a matrix material or a ceramic such as $UO_2$. It is desirable in all cases and necessary in the case of power reactors that a good mechanical or metallurgical bond exist at the clad-core interface, since the presence of voids would create considerable resistance to heat flow from the core to the cladding, causing hot spots to develop in the element.

Areas having high temperature differentials would result if such discontinuities existed in the bond, leading to an enhanced possibility of structural failure of the fuel element. Such failure could be due to thermal shock or distortion or a combination thereof. However, the major danger is a failure of the isolating clad permitting dangerous fission by products to escape as by burnthrough of the clad. Structural failure of a reactor fuel element is not only undesirable, but is hazardous and expensive to correct.

Various techniques have been employed in fuel element fabrication, largely depending upon the nature of the core and clad materials. Metallic cores are usually prepared by melting techniques to form an ingot which is then forged, rolled, extruded or swaged into a specific geometry. Cermet cores, that is, cores containing dispersions of uranium ceramic compounds in metallic matrices are generally prepared by powder metallurgy techniques involving one or a combination of several methods such as cold pressing and sintering, hot pressing, extrusion and sintering, or powder rolling and sintering. Ceramic cores such as uranium dioxide rods are also prepared by powder techniques such as cold compacting and sintering, hot pressing or extrusion and sintering.

Final fabrication of a fuel element is then accomplished by bonding the preformed core to a wrought clad by rolling, extruding, swaging, hot pressing, etc., with or without the application of heat. It is noteworthy that conventional fuel fabrication techniques as indicated above require the production of a well-wrought core and clad before the bonding step. There are recognized disadvantages to these methods. First, certain materials having desirable nuclear or metallurgical properties, or both, are not available in wrought form, for example, zirconium carbide or molybdenum. Secondly, the above techniques necessitate the use of heavy equipment in at least two forming steps, namely core fabrication and the final sizing operation, to insure good bonding. Various other operations are also commonly called for in fuel element fabrication such as chemical cleaning of the clad, inserting a metal filler between core and clad, welding the clad and trimming off excess material. The last operation, furthermore, involves a significant amount of waste of costly materials and presents a health hazard problem.

The fuel element fabrication method of the present invention possesses substantial advantages. It does not suffer from the aforementioned limitations since the present invention provides a method of manufacturing fuel elements obviating the use of well-wrought materials. It is simple to practice and may be used with a variety of materials to produce fuel elements of different geometries. The fuel element of the present invention is characterized by a consistently excellent bond between clad and core. The geometry of the fuel element of the present invention may vary to a degree not found to be feasible previously. Fuel element in many shapes, such as rod, tube, sphere, plate or disc configurations may be produced. Lastly, the expense and hazards of waste material are eliminated.

In accordance with the present invention, the fuel element comprises a core of fissionable material having the surface thereof clad with a sintered material which may be a metal such as stainless steel, aluminum, zirconium or molybdenum, alloys of iron, aluminum, zirconium, or molybdenum, or ceramics such as titanium carbide, tungsten carbide, zirconium carbide or molybdenum disilicide.

In the manufacture of the fuel element, finely divided fissionable material is compacted into a core of desired shape for the clad member. The fissionable material may be uranium dioxide, uranium, thorium oxide, plutonium oxide, etc., according to the chemical compatibility of the clad with core materials. The powdered material has an average particle size of about 5 to 80 microns. The compacting of the subdivided material is effected by the use of suitable dies and pressure. In the operation, the powdered or subdivided fissionable material is placed in the die and subjected to a pressure of about 1,000 to 50,000 p.s.i.g. without the application of heat. The compacted body may then be handled without risk of disintegration or powdering. The fissionable material may be used alone or it can be admixed with a matrix material such as the clad previously described, namely, stainless steel, aluminum, zirconium carbide, titanium carbide, tungsten carbide, molybdenum, molybdenum disilicide, aluminum alloy, iron alloy, zirconium alloy or molybdenum alloy. In regard to the various matrix materials mentioned above, it is preferred to use stainless steel or aluminum for the reason that excellent results are obtained by their use.

The clad material is pre-formed into a body of any desired shape by compacting. The compacted body may be, for example, cylindrical, spherical, rectangular, or cubical. The subdivided clad material which is used to make the compacted body may have an average particle size of between about 5 to 80 microns. The powdered or finely divided clad material is placed in a suitable die and compacted by the application of pressure, without the application of heat, into the desired form. The pressure of the compacting treatment is about 1,000 to 50,000 p.s.i.g. The procedure for compacting the finely divided clad material is the same as that employed in the making of the core of fissionable material.

In the case of preparing a cylindrically shaped sintered body, the clad material is compacted into three component parts or elements, namely, a cylindrical or central segment and two discs for covering the ends of the segment. A spherically shaped fuel element would require two hemispherical segments of clad material. The component parts of a cubical or rectangular shaped clad element are similar to the cylindrical shaped clad element discussed above. In the case of producing long fuel elements of cylindrical, rectangular or square cross-section, the procedure is effected by joining open-ended central segments to obtain the desired length and then sealing the remaining open ends, with "dead ends" as described below.

After the core of fissionable material and clad material have been prepared as compacted bodies, the materials are assembled and subjected to a sintering treatment under pressure. In the assembly operation, the core is placed or encased within the clad material and the entire assembly is put into a graphite die for further treatment at an elevated temperature and pressure. To avoid sticking of the clad material to the surfaces of the die, the inner die surfaces are coated with a slurry of a refractory material such as alumina, zirconia or magnesia. The heated clad assembly is also subjected to an elevated pressure of about 1,000 to 5,000 p.s.i.g.

Sintering under pressure produces a seamless clad showing extensive grain growth across the original clad interfaces. In those cases where the clad is capable of metallurgically bonding with the core, an excellent bond is obtained. It is evident, for the nature of this method that even when a metallurgical bond is not or cannot be obtained, there will be an excellent mechanical bond. It is preferred to sinter stainless steel at a temperature of about 1150° to 1300° C. for a period of about 5 to 30 minutes. When aluminum is used as the clad material, it is preferably sintered at a temperature of about 550° to 600° C. for a period of 5 to 30 minutes. Molybdenum disilicide is preferably sintered at a temperature of about 1500° to 1700° C. and at a pressure of about 3000 to 5000 p.s.i.g. for a period of about 5 to 30 minutes.

Metallurgical bonding of the clad to the core is dependent upon the sintering temperatures of the materials used. If the clad and fissionable material cannot be sintered together so as to form a metallurgical bond between them, it is generally desirable to incorporate material (not less than about 50% by volume) into the core which will metallurgically bond with the clad material. In the case of an aluminum cladded $UO_2$ core, aluminum is intermixed with the $UO_2$ so that a metallurgical bond between the aluminum in the clad and in the core will be produced during sintering. The aluminum in the core also serves as a binding agent by forming a matrix around the $UO_2$ particles. This metal matrix enhances the structural stability of the core and acts as a heat transfer medium which carries heat developed in the fissionable material to the clad.

Other examples of clad; core; matrix combinations are: $SS:UO_2:SS$, $MoSi_2:UO_2:MoSi_2$, $Mo:UO_2:Mo$, $ZrC:PuO_2:ZrC$, $Mo:ThO_2:MoSi_2$. In all these exemplary combinations, the clad may be metallurgically bonded to the core because both the clad material and matrix material sinter at a temperature well below the melting point of either. Uranium dioxide sinters at about 1500° C. Consequently, when the clad and matrix materials (which may be the same) sinter at a temperature between about 1500° C. and the melting point of $UO_2$, the whole assembly, that is, clad and core, may be sintered. (For example, a member comprising a $UO_2:MoSi_2$ core clad with $MoSi_2$ may be completely sintered.) It is to be understood that clad materials other than these mentioned specifically herein will be readily recognized by persons skilled in the art as equivalents for the purpose of the present invention. It is also to be understood that powder metallurgy articles containing non-fissionable material may be fabricated by our method. Such articles may be partially sintered, completely sintered or not sintered at all, depending upon the use for which the article is intended, such as a thermal insulator.

To provide a better understanding of the present invention, reference will be had to the accompanying drawing which forms a part of this specification.

In the drawing, a cylindrically shaped core 5 of uranium dioxide and stainless steel having a diameter of ⅝" and a length of ⅝" was prepared by compacting finely divided uranium dioxide having an average particle size of about 250 mesh with 50 w/o Al powder having an average particle size of about 200 mesh at a pressure of about 1500 p.s.i.g. A cylinder 6 of stainless steel was made from powdered stainless steel having an average particle size of about 300 mesh which was compacted at a pressure of 1500 p.s.i.g. The cylinder 6 has a wall thickness of about ⅛" and an internal diameter slightly larger than the diameter of the core 5. Two discs 7 and 8 were prepared from the same stainless steel powder and by the same technique. These discs have a diameter slightly greater than ⅞" and a thickness of approximately ⅛". In the preparation of the finished body, the core 5 is placed within the cylinder 6 and discs 7 and 8 are placed in position at each open end of the cylinder. The clad assembly is placed in a die (not shown) in which the temperature is raised to 1200° C. and a pressure of 5000 p.s.i.g. is applied. Sintering took place for a period of 20 minutes. Following the sintering operation, the sintered fuel element was divided in half along the longitudinal axis for examination purposes. This view is shown in FIGURE 3. Submicroscopic analyses were made at the boundary between the clad material and the core, and it was found that extensive diffusion annealing had taken place. This is evidence of effective bonding between the clad and the core. In contrast thereto, a clad body prepared from wrought clad metal revealed under submicroscopic examination a clear line of demarcation between the clad metal and core, thus indicating poor metallurgical bonding between the two materials.

Having thus provided a written description of our invention along with specific examples thereof, it should be understood that no undue limitations or restrictions are to be imposed by reason thereof but that the present invention is defined by the appended claim.

We claim:

A fuel element for a nuclear reactor consisting of a cermet core of particles of an oxide of a fissionable metal uniformly dispersed and embedded in a continuous matrix of a material selected from the group consisting of aluminum, zirconium, molybdenum, zirconium carbide and molybdenum disilicide, the matrix material constituting at least about 50 percent of the volume of said core, and a seamless supporting envelope of essentially uniform thickness encasing said core and composed of a material as selected from said group selected for said continuous matrix, and said envelope being metallurgically bonded to said core.

References Cited in the file of this patent

UNITED STATES PATENTS

| | | |
|---|---|---|
| 2,399,773 | Waintrob | May 7, 1946 |
| 2,695,231 | Causley | Nov. 23, 1954 |
| 2,725,288 | Dodds et al. | Nov. 29, 1955 |
| 2,805,473 | Handwerk et al. | Sept. 10, 1957 |
| 2,814,857 | Duckworth | Dec. 3, 1957 |
| 2,818,605 | Miller | Jan. 7, 1958 |
| 2,843,539 | Bornstein | July 15, 1958 |
| 2,863,814 | Kesserling et al. | Dec. 9, 1958 |
| 2,907,705 | Blainey | Oct. 6, 1959 |
| 2,914,454 | Gurinsky et al. | Nov. 24, 1959 |
| 2,920,025 | Anderson | Jan. 5, 1960 |

FOREIGN PATENTS

| | | |
|---|---|---|
| 752,152 | Great Britain | July 4, 1956 |
| 754,559 | Great Britain | Aug. 8, 1956 |
| 788,926 | Great Britain | Jan. 8, 1958 |

OTHER REFERENCES

Nucleonics, March 1956, pp. 34–44.

HW–52729, September 18, 1957, by Evans, in particular pp. 14–16.

WAPD–PWR–PMM–491, Belle and Jones, September 12, 1956, pp. 76–77.